United States Patent
Shim et al.

(10) Patent No.: US 8,850,600 B2
(45) Date of Patent: Sep. 30, 2014

(54) DATA STORAGE DEVICE AND DATA STORAGE SYSTEM INCLUDING THE SAME

(75) Inventors: Jun Seok Shim, Seongnam-si (KR); Young Sun Park, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 877 days.

(21) Appl. No.: 12/783,827

(22) Filed: May 20, 2010

(65) Prior Publication Data

US 2010/0306857 A1 Dec. 2, 2010

(30) Foreign Application Priority Data

Jun. 1, 2009 (KR) .................. 10-2009-0048021

(51) Int. Cl.
  *G06F 21/00* (2013.01)
  *G06F 12/00* (2006.01)
(52) U.S. Cl.
  USPC ...... 726/27; 725/4; 725/22; 725/23; 711/157; 711/158; 711/167
(58) Field of Classification Search
  USPC .................. 726/3, 27; 711/104, 163, 148
  See application file for complete search history.

(56) References Cited

U.S. PATENT DOCUMENTS

| 4,941,174 | A * | 7/1990 | Ingham ........................... 380/52 |
| 6,546,471 | B1 * | 4/2003 | Tarui et al. ..................... 711/148 |
| 6,622,184 | B1 * | 9/2003 | Tabe et al. ....................... 710/36 |
| 6,792,528 | B1 * | 9/2004 | Hou .............................. 380/57 |
| 2002/0116551 | A1 * | 8/2002 | Imamura et al. ................. 710/1 |
| 2005/0050240 | A1 * | 3/2005 | Wilkins et al. ................. 710/15 |

FOREIGN PATENT DOCUMENTS

| JP | 04219823 A | 8/1992 |
| JP | 11073309 A | 3/1999 |

OTHER PUBLICATIONS http://www.cosic.esat.kuleuven.be/publications/article-1013.pdf "Embedded Trusted Computing with Authenticated Non-Volatile Memory"—Jul. 2008 Philips Research Laboratories.*
http://www.cl.cam.ac.uk/techreports/UCAM-CL-TR-763.pdf "Security for volatile FPGAs"—University of Cambridge, Jun. 2007.*

* cited by examiner

*Primary Examiner* — Randy Scott
(74) *Attorney, Agent, or Firm* — Cesari & Reed, LLP; Kirk A. Cesari

(57) ABSTRACT

A data storage device protecting security code stored therein and a data storage system including same are disclosed. The data storage device efficiently prevents unauthorized access to the security code by allowing command descriptor block (CDB) information to be read using only a read-only memory (ROM).

20 Claims, 3 Drawing Sheets

DATA STORAGE DEVICE AND DATA STORAGE SYSTEM INCLUDING THE SAME

CROSS-REFERENCE TO RELATED APPLICATIONS

This application claims priority under 35 U.S.C. §119 to Korean Patent Application No. 10-2009-0048021 filed on Jun. 1, 2009, the subject matter of which is hereby incorporated by reference.

BACKGROUND

The present inventive concept relates to data security technology, and more particularly, to data storage devices capable of efficiently preventing unauthorized access to security code by allowing command descriptor block (CDB) information to be read using only read-only memory (ROM) code. The inventive concept also relates to data storage systems including this type of data security technology.

Hard disk drives (HDDs) allow random data access, provide satisfactory data transmission rates, provide large data storage capacity, and are relatively inexpensive as compared with other types of auxiliary memory devices. For at least these reasons, HDDs are widely used to store (e.g.,) multimedia data. With wide use of HDDs, HDD data security is an important issue. Accordingly, HDD data is commonly encrypted and/or a user authentication procedure is required to access the HDD data.

Most HDD security functions require some form of security code such as an encryption key to authenticate a user or encrypt data. Security code must be protected from external attack, since an unauthorized user may incapacitate a security function by changing stored security code. Yet, the security code must remain readily accessible and changeable to an authorized user.

Security code is typically stored in a predetermined region of the HDD. It is commonly stored, accessed, and used via software or firmware. Access to this enabling software or firmware is restricted to only an authorized entity, such as the HDD manufacturer. However, it is sometimes necessary to access the software or firmware in order to upgrade capabilities, correct a programming bug, etc. Hence, a "security download function" accessing the software or firmware enabling the security functions of a HDD allows an authorized entity to make necessary changes. Unfortunately, the security download function not only allows necessary software/firmware downloads, but also creates a vulnerability that may be exploited by unauthorized entities seeking to incapacitate the security function.

SUMMARY

Certain embodiments of the inventive concept provide a data storage device and system capable of protecting security code without impairing a constituent software/firmware download function.

According to certain embodiments of the inventive concept, there is provided a data storage device including: a command descriptor block (CDB) configured to store a command received from a host; a controller configured to control execution of an access operation directed to stored data when the received command is determined to be an access command, and further configured to control execution of a security operation associated with stored security code when the received command is determined to be a security command; and a switching circuit configured to selectively provide the received command from the CDB to the controller.

According to certain embodiments of the inventive concept, there is provided a data storage system including: a host and a data storage device, wherein the data storage device is configured to execute an access operation and a security operation. The data storage device comprises; a command descriptor block (CDB) configured to store a command received from a host, a controller configured to control execution of an access operation directed to stored data when the received command is determined to be an access command, and further configured to control execution of a security operation associated with stored security code when the received command is determined to be a security command, and a switching circuit configured to selectively provide the received command from the CDB to the controller.

According to certain embodiments of the inventive concept, there is provided a method of executing an oration in a data storage device storing data and security code, the method including; receiving a command in the data storage system from a host, storing the received command in a command descriptor block (CDB), determining whether the received command is an access command associated with an access operation directed to the stored data, or a security command associated with a security operation directed to the stored security code, upon determining that the received command is the access command, enabling a buffer disposed between the CDB and a controller to enable the buffer to pass the access command to the controller and calling an access command dispatcher to execute the access operation, and upon determining that the received command is the security command, disabling the buffer to prevent passing of the security command to the controller and calling a security command dispatcher to execute the security operation.

BRIEF DESCRIPTION OF THE DRAWINGS

The above and other features and advantages of the inventive concept will become more apparent upon consideration of detail exemplary embodiments thereof with reference to the attached drawings in which.

DETAILED DESCRIPTION OF THE EMBODIMENTS

The inventive concept now will be described in some additional detail with reference to the accompanying drawings. The inventive concept may, however, be embodied in many different forms and should not be construed as being limited to only the illustrated embodiments. Rather, the embodiments are presented as teaching examples.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
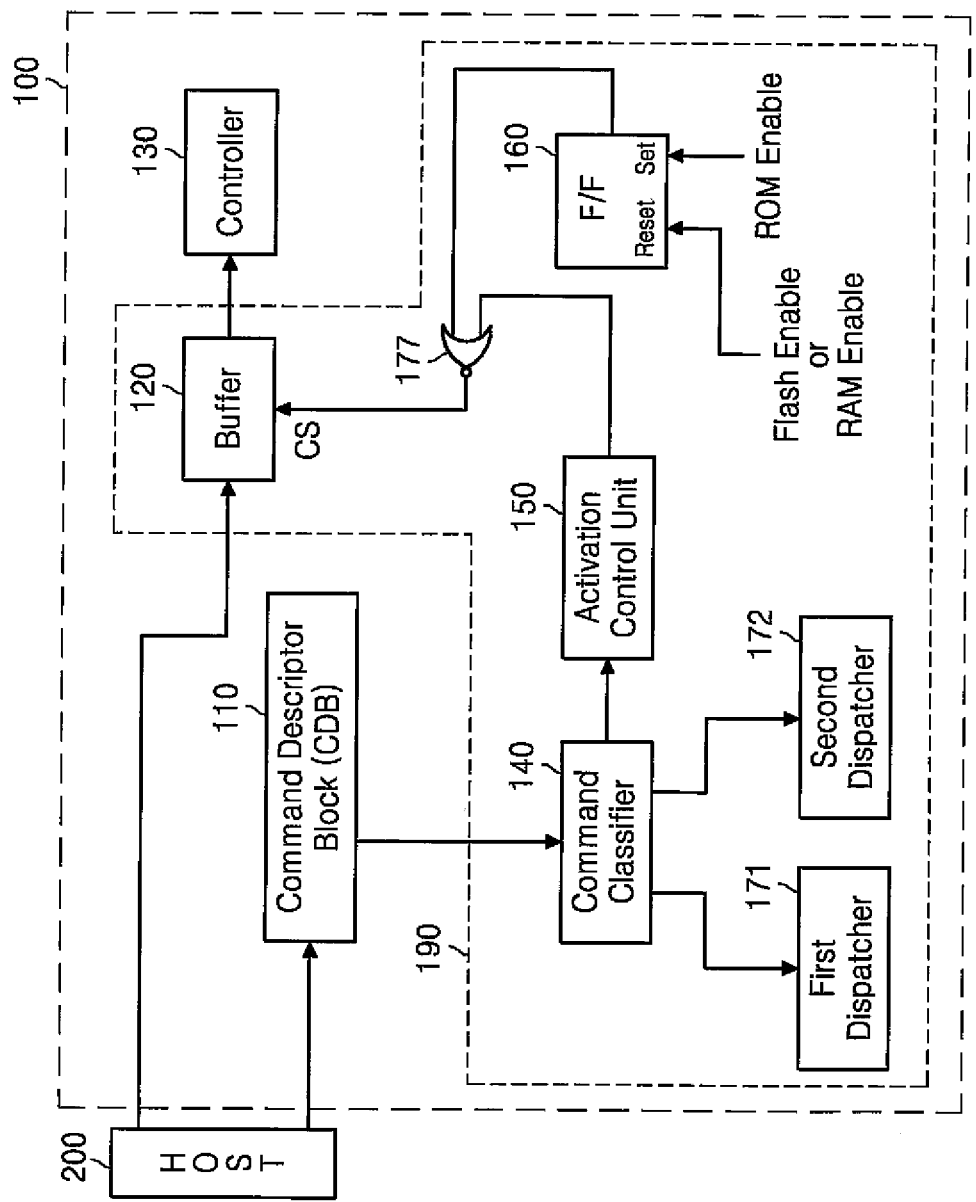
FIG. 1 is a schematic block diagram of a data storage device according to an embodiment of the inventive concept.

Figure (FIG. 1 is a schematic block diagram of a data storage device 100 according to an embodiment of the inventive concept. The data storage device 100 generally comprises a command descriptor block (CDB) 110, a controller 130, and a switching circuit 190.

The CDB 110 stores a command received from a host 200. The command received by the CDB 110 may include an operation code, and/or it may define a logical block address, a transfer length, a control byte, etc.

The controller 130 generally controls access operations directed to the HDD based on the command received by the CDB 110. An access operation is an operation that is capable of effecting "payload" data and includes, as examples, a write (program) operation, an erase operation, and a read operation. Access operations are contrasted with security operations that are restricted to data controlling one or more security functions in the HDD. Thus, when a command (access or security) is provided by the host 200 to the controller 130, the CDB 110 temporarily stores the command, and may intermediately process the command before passing it to the controller 130.

The switching circuit 190 controls a buffer 120 positioned between the host 200 and controller 130. In its operation, the switching circuit 190 essentially enables/disables the buffer 120 such that the command received from the host 200 is selectively provided to the controller 130. In the illustrated embodiment of FIG. 1, the switching circuit 190 comprises a command classifier 140 and a flip-flop (F/F) circuit 160 associated with the buffer 120.

The command classifier 140 determines whether a command stored in the CDB 110 is an access command or a security command. The command classifier 140 may be operated by means of a read-only memory (ROM) or similar device. As such, the command classifier 140 does not allow unauthorized user access and cannot be readily changed after the data storage device 100 is manufactured—unlike more readily programmable forms of code storage such as DRAM, SRAM, EEPROM, etc. After a command stored in the CDB 110 has been classified as an access command or a security command by the command classifier 140, the received command is dispatched according to its type. An exemplary dispatch operation is described in some additional detail with reference to FIGS. 1 and 2.

Figure 2:
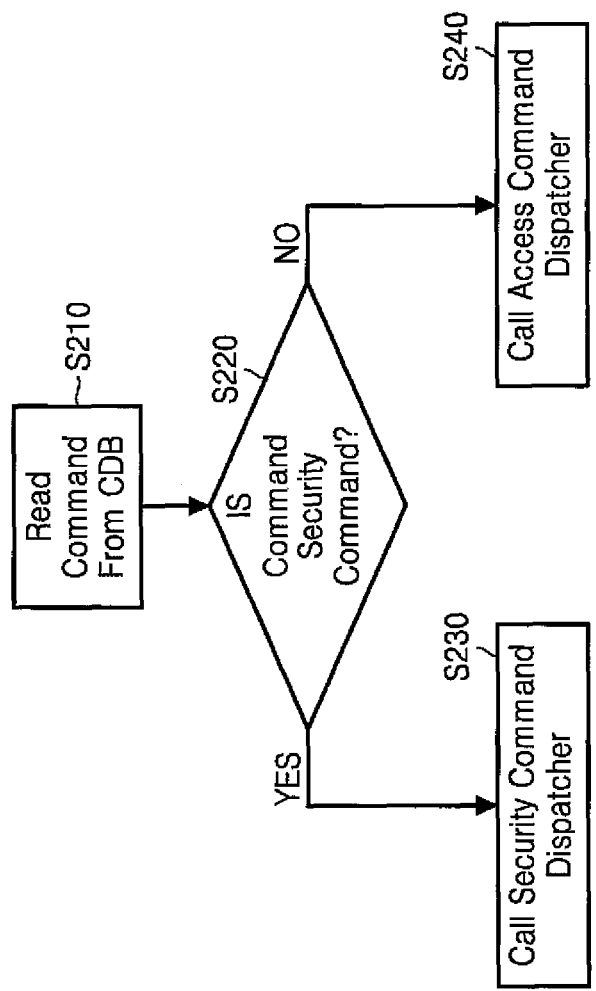
FIG. 2 is a flowchart summarizing a dispatch operation according to an embodiment of the inventive concept.

Referring to FIGS. 1 and 2, the command classifier 140 reads a command from the CDB 110 (S210) and determines whether the command is a security command or an access command (S220). When it is determined that the received command is a security command (S220=YES), the command classifier 140 calls a first dispatcher 171 to dispatch the security command (S230). In this context, the term "call" means evoking or initiating operation of the software/hardware/firmware enabling the operation of the first dispatcher. Thus, the first dispatcher 171 may be termed a security command dispatcher.

Alternately, when it is determined that the received command is an access command (S220=NO), the command classifier 140 calls a second dispatcher 172 (S240). Thus, the second dispatcher 172 may be termed a read/write command dispatcher.

As is conventionally understood, the first and second dispatchers 171 and 172 may perform a dispatch operation using a "new command interrupt" technique. For instance, the dispatcher operation may include calling a defined function or set of functions configured to execute the command received from the host 200.

For example, as illustrated in FIG. 1, after determining its type a received command may be sent by the command classifier 140 to an activation control unit 150. The activation control unit 150 selectively outputs either a first enable signal (i.e., an activated enable signal) or a second enable signal (i.e., a deactivated enable signal) on the basis of the determination result provided by the command classifier 140.

For instance, in a case where the command classifier 140 and the first dispatcher 171 are embodied as ROM code and the second dispatcher 172 may be embodied as random access memory (RAM) code or a flash code. Thus, when the command classifier 140 determines that a command stored in the CDB 110 is an access command, the second dispatcher 172 is called and the activation control unit 150 is deactivated while a RAM enable signal or a flash enable signal is activated. Accordingly, the buffer 120 may be enabled according to a result (e.g., a chip select signal CS) provided by an exclusive OR operation of a logic element 177. As a result, data stored in the buffer 120 may be transferred to the controller 130 from the buffer 120 as initially provided by the host 200.

Similarly, when the command classifier 140 determines that a command stored in the CDB 110 is a security command, the first dispatcher 171 is called and a ROM enable signal is activated. Accordingly, the buffer 120 may be enabled by the result CS of the exclusive OR operation performed by the logic element 177. As a result, data stored in the buffer 120 is transferred to the controller 130 of the buffer 120 receives data from the host 200.

When the first dispatcher 171 does not operate in ROM but operates in RAM or flash memory, the command classifier 140 is activated, but the F/F circuit 160 is deactivated by the RAM enable signal. As a result, the buffer 120 is disabled and data transfer from the host 200 to the controller 130 is interrupted.

Referring to FIG. 1, the ROM enable signal is used as a set input signal for the F/F circuit 160, and the flash or the RAM enable signal is used as a reset input signal for the F/F circuit 160. In other words, command information stored in the CDB 110 may be read using only a ROM code and there are no other ways to access the command information stored in the CDB 110. Accordingly, the unauthorized access of security code associated with the command information is greatly inhibited is not completely prevented.

In addition, when the data storage device 100 is embodied as shown in FIG. 1, it is impossible to bypass the security code. For instance, when a branch address is not set to the security code but is set to another region (e.g., flash memory or RAM) in the "new command: interrupt" in order to bypass the security code, information in the CDB 110 cannot be read and it is impossible to execute a normal access operation.

In order to prevent an unauthorized user from changing the security code, the security code may be stored in a ROM area. In other embodiments of the inventive concept, the security code may be stored in an area other than a ROM area which will be described in some additional detail below.

A data storage device, (e.g., a disk or a flash memory), may include a buffer memory. An encryption/decryption block may be provided between the buffer memory and a storage space. The encryption/decryption block may use an encryption key for encryption. The encryption key may be set correctly only when authentication to the data storage device is executed in a normal way. In otherwise cases, a wrong encryption key may be set. As a result, when an encrypted message or data is decrypted, an original message or data cannot be restored.

As for the data storage device having such security function, a security code executed by a security command may be encrypted and stored in the storage device while access code executed by an access command may be stored without encryption. To execute the security code, the data storage device may also use code overlay. An overlay code may be stored in the ROM area so as to be protected from unauthorized changes. Here, the access code can be downloaded as if in a normal drive, but the security code can be updated only when the data storage device is unlocked using a proper authentication procedure. Consequently, even if an unauthorized user knows the position in memory where the security code is stored, he/she will not be able to acquire access to the security code without going through the authentication procedure.

Figure 3:
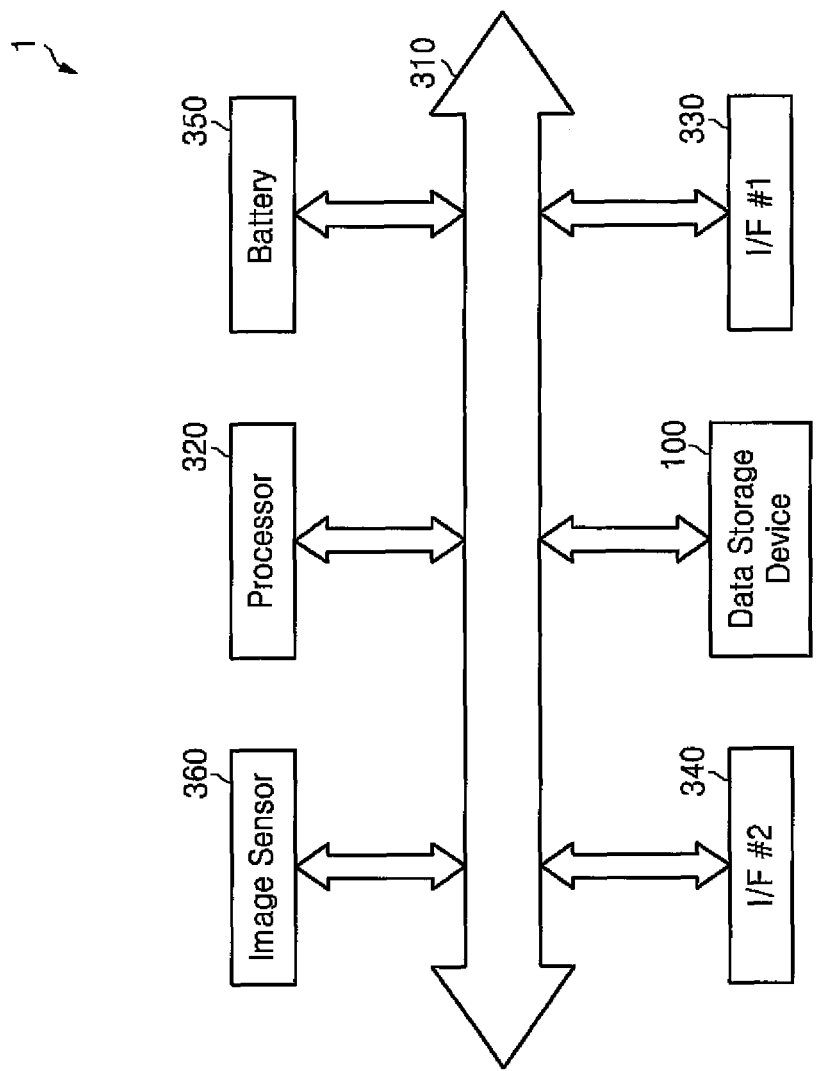
FIG. 3 is a schematic block diagram of a computational system incorporating a data storage device according to certain embodiments of the inventive concept.

FIG. 3 is a schematic block diagram of a general computational system 1 incorporating a data storage device 100 according to certain embodiments of the inventive concept. Referring to FIG. 3, the computational system 1 comprises the data storage device 100 and a processor 320 connected via a system bus 310. The processor 320 generates control signals and commands controlling access and security operations within the data storage device 100. Accordingly, a controller, such as controller 130 in FIG. 1, is included in the data storage system 1 to control the execution of access and security operations in response to commands provided by the processor 320.

In the context of the foregoing computational system, certain embodiments of the inventive concept may be implemented as computer-executable programs and stored in computer-readable recording medium. The computer readable recording medium may include a program command, a data file, a data structure, or a combination thereof. The program command written to the computer readable recording medium may be specially designed and configured or may be already known to those skilled in the field of computer software. Examples of the computer readable recording medium include magnetic storage media (e.g., hard disks, floppy disks, and magnetic taps), optical recording media (e.g., CD-ROMs and DVDs), magneto-optical storage media (e.g., floptical disks), and hardware devices (e.g., ROMs, RAMs, PRAMs, RRAMs, FRAMs, and flash memories) configured to store and execute program commands.

When the computational system 1 is embodied as a portable device, it may further include a battery 350 to supply operating power. The portable device may be a portable computer, a digital camera, a personal digital assistant (PDA), a cellular telephone, a smart phone, an MP3 player, a portable multimedia player (PMP), an automotive navigation system, a memory card, a system card, a game console, an electronic dictionary, or a solid state disk.

The computational system 1 may also include an interface 330, e.g., an input/output unit, to communicate data with an external data processing device. When the computational system 1 is a wireless system, its may also include a wireless interface 340 which may be connected to the processor 320 and communicate data with an external wireless device. The wireless system may be a wireless device such as PDA, a portable computer, a wireless telephone, a pager, or a digital camera; a radio frequency identification (RFID) reader; or an RFID system. The wireless system may also a wireless local area network (WLAN) system or a wireless personal area network (WPAN) system. Moreover, the wireless system may be a cellular network.

When the computational system 1 is an image pick-up device, its may also include an image sensor 360 configured to convert an optical image into corresponding electrical signals. The image sensor 360 may be an image sensor using a charge coupled device (CCD) or a complementary metal-oxide semiconductor (CMOS) image sensor. For example, the computational system 1 may be a digital camera, a cellular telephone equipped with a digital camera, or a satellite system equipped with a camera.

A data storage device according to certain embodiments of the inventive concept may be implemented in various types of packaging. The various types of packaging may include a Package on Package (PoP), a Ball Grid Array (BGA), a Chip Scale Package (CSP), a Plastic Leaded Chip Carrier (PLCC), a Plastic Dual In-line Package (PDIP), a die in waffle pack, a die in wafer form, a Chip On Board (COB), a CERamic Dual In-line Package (CERDIP), a plastic Metric Quad Flat Pack (MQFP), a Thin Quad Flat Pack (TQFP), a Small Outline Integrated Circuit (SOIC), a Shrink Small Outline Package (SSOP), a Thins Small Outline Package (TSOP), a System In Packate (SIP), a Multi Chip Package (MCP), a Wafer-level Fabricated Package (WFP), and a Wafer-level processed Stack Package (WSP).

As described above, according to embodiments of the inventive concept, attacks on security code stored in a data storage device may be effectively prevented while yet fully enabling a software/firmware download function.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An apparatus comprising:
    a data storage device including:
        a buffer configured to store a command received from a host via an interface of the data storage device;
        a command descriptor block (CDB) configured to store command information about the command received from the host;
        a switching circuit configured to control the buffer to selectively provide the received command from the buffer to a controller, the switching circuit including:

a command classifier including a read-only memory (ROM) to store program code that when executed determines whether the command is an access command or a security command based on the command information in the CDB;

when the command is an access command, the command classifier enables the buffer to provide the command to the controller; and when the command is a security command and a random access memory is operative, the command classifier disables the buffer to prevent the command from being processed by the controller.

2. The apparatus of claim 1, wherein the switching circuit comprises
a flip-flop circuit configured to output a switching control signal based on the determination of the command classifier.

3. The apparatus of claim 2, wherein the flip-flop circuit is configured to receive the determination of the command classifier as a set input, wherein the set input is activated when the received command is an access command.

4. The apparatus of claim 3, wherein the command classifier is further configured to operate in a read-only memory (ROM) and the set input is a ROM enable signal when it is determined that the received command is a security command.

5. The apparatus of claim 3, wherein the flip-flop circuit is further configured to output a first switching control signal in response to the activated set input and the buffer is enabled in response to the first switching control signal.

6. The apparatus of claim 2, wherein the flip-flop circuit is configured to receive the determination of the command classifier as a reset input, wherein the reset input is activated when the received command is the security command.

7. The apparatus of claim 6, wherein the flip-flop circuit is further configured to output a second switching control signal in response to the activated reset input and the buffer is disabled in response to the second switching control signal.

8. A system comprising:
a data storage device configured to receive a command from a host;
the data storage device comprising:
a buffer configured to store the command;
a command descriptor block (CDB) configured to store command information about the command; and
a switching circuit configured to control the buffer to selectively provide the received command from the buffer to a controller, the switching circuit including:
a command classifier to determine whether the command is an access command or a security command based on the command information in the CDB;
when the command is an access command, the command classifier enables the buffer to provide the command to the controller; and
when the command is a security command, the command classifier disables the buffer to prevent the command from being processed by the controller.

9. The system of claim 8, wherein the switching circuit comprises
a flip-flop circuit configured to output a switching control signal based on the determination of the command classifier.

10. The system of claim 8, wherein the data storage device is a hard disk drive (HDD).

11. The system of claim 9, wherein the flip-flop circuit is configured to receive the determination of the command classifier as a set input, wherein the set input is activated when the received command is an access command.

12. The system of claim 11, wherein the command classifier is further configured to operate in a read-only memory (ROM) and the set input is a ROM enable signal when it is determined that the received command is a security command.

13. The system of claim 11, wherein the flip-flop circuit is further configured to output a first switching control signal in response to the activated set input and the buffer is enabled in response to the first switching control signal.

14. The system of claim 9, wherein the flip-flop circuit is configured to receive the determination of the command classifier as a reset input, wherein the reset input is activated when the received command is the security command.

15. The system of claim 14, wherein the flip-flop circuit is further configured to output a second switching control signal in response to the activated reset input and the buffer is disabled in response to the second switching control signal.

16. The system of claim 8, further comprising the switching circuit further configured to disable the buffer to prevent the command from being processed by the controller when the command is a security command and a random access memory (RAM) enable signal is activated.

17. A method comprising:
receiving a command at a data storage system from a host and storing the command in a buffer; storing information about the command in a command descriptor block (CDB); executing a command classifier, via a switching circuit configured to control the buffer, to determine whether the command is an access command or a security command associated with a security operation based on the information about the command in the CDB; upon determining the command is an access command, the command classifier enables the buffer to provide the command to a controller; and upon determining the command is a security command, the command classifier disables the buffer to prevent passing of the command to the controller and the data storage device initiates a security command dispatcher to execute the security operation.

18. The method of claim 17, wherein the security command dispatcher is embodied only as ROM code.

19. The method of claim 17, further comprising:
determining whether the command is an access command associated with an access operation directed to data stored at the data storage system;
upon determining that the command is an access command, enabling the buffer to pass the access command to the controller and calling an access command dispatcher to execute the access operation; and
wherein the access command dispatcher is embodied as random access memory (RAM) code.

20. The system of claim 16, further comprising the switching circuit further configured to enable the buffer to allow the command to be processed by the controller when the command is a security command and a read-only memory (ROM) enable signal is activated.

* * * * *